United States Patent
Datta et al.

(10) Patent No.: US 10,647,841 B2
(45) Date of Patent: May 12, 2020

(54) THERMOPLASTIC POLYOLEFIN CONTAINING AMORPHOUS ETHYLENE ELASTOMER

(71) Applicant: ExxonMobil Chemical Patents Inc., Baytown, TX (US)

(72) Inventors: Sudhin Datta, Houston, TX (US); Xin Chen, Humble, TX (US); Abdul M. Jangda, Humble, TX (US); Rohan A. Hule, Houston, TX (US); Jan Kalfus, Spring, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 299 days.

(21) Appl. No.: 15/504,233

(22) PCT Filed: Aug. 21, 2015

(86) PCT No.: PCT/US2015/046252
§ 371 (c)(1),
(2) Date: Feb. 15, 2017

(87) PCT Pub. No.: WO2016/057124
PCT Pub. Date: Apr. 14, 2016

(65) Prior Publication Data
US 2017/0275443 A1    Sep. 28, 2017

Related U.S. Application Data

(60) Provisional application No. 62/060,142, filed on Oct. 6, 2014.

(30) Foreign Application Priority Data

Nov. 25, 2014    (EP) .................................... 14194811

(51) Int. Cl.
*C08L 23/14*    (2006.01)

(52) U.S. Cl.
CPC ........... *C08L 23/14* (2013.01); *C08L 2205/02* (2013.01); *C08L 2205/03* (2013.01);
(Continued)

(58) Field of Classification Search
CPC ...... C08L 23/14; C08L 23/12; C08L 2207/14; C08L 2207/04; C08L 2205/06; C08L 2205/02; C08L 2205/03; C08L 2205/025
See application file for complete search history.

(56) References Cited

U.S. PATENT DOCUMENTS 4,379,759 A    4/1983    Goeke et al.
5,026,798 A    6/1991    Canich
(Continued)

FOREIGN PATENT DOCUMENTS

EP    0129368    12/1984
EP    0792914    9/1997
(Continued)

*Primary Examiner* — Michael Robinson
(74) *Attorney, Agent, or Firm* — Catherine L. Bell

(57) ABSTRACT

Disclosed is a thermoplastic polyolefin composition useful in automotive components comprising at least a polypropylene having a melting point temperature ($T_m$) of greater than 130° C. and a melt flow rate (230° C./2.16 kg) within the range from 10 g/10 min to 80 g/10 min; an amorphous ethylene-propylene copolymer comprising within the range from 40 wt % to 80 wt % ethylene derived units and having a melt flow rate (230° C./2.16 kg) within the range from 0.1 g/10 min to 20 g/10 min; and a propylene-based elastomer having within the range from 5 to 25 wt % ethylene derived units and having a $T_m$ of less than 110° C. The composition only partially breaks or there is no break at −29° C. (ASTM
(Continued)

D256) with Notched Izod Force of between 10 to 40 ft-lb/in$^2$ at 22° C. (533 to 2,132 J/m$^2$), and between 1.0 to 12 ft-lb/in$^2$ at −29° C. (53 to 636 J/m$^2$).

25 Claims, 2 Drawing Sheets

(52) U.S. Cl.
CPC ....... *C08L 2205/06* (2013.01); *C08L 2207/04* (2013.01); *C08L 2207/14* (2013.01)

(56) References Cited

U.S. PATENT DOCUMENTS

| | | | |
|---|---|---|---|
| 5,177,147 A | 1/1993 | Spenadel et al. | |
| 5,198,401 A | 3/1993 | Turner et al. | |
| 5,504,172 A | 4/1996 | Imuta et al. | |
| 5,698,650 A | 12/1997 | Jourdain et al. | |
| 5,770,753 A | 6/1998 | Kuber et al. | |
| 5,959,030 A | 9/1999 | Berta | |
| 6,232,402 B1 | 5/2001 | Demeuse | |
| 6,245,856 B1 * | 6/2001 | Kaufman | C08L 23/12 525/191 |
| 6,288,171 B2 | 9/2001 | Finerman et al. | |
| 6,376,610 B1 | 4/2002 | Dharmarajan et al. | |
| 6,525,157 B2 | 2/2003 | Cozewith et al. | |
| 6,642,316 B1 | 11/2003 | Datta et al. | |
| 6,686,415 B1 | 2/2004 | Terfloth et al. | |
| 6,747,114 B2 | 6/2004 | Karandinos et al. | |
| 7,105,603 B2 | 9/2006 | Dharmarajan et al. | |
| 9,096,752 B2 | 8/2015 | Grestenberger et al. | |
| 9,458,254 B2 | 10/2016 | Canich et al. | |
| 2002/0004575 A1 | 1/2002 | Cozewith et al. | |
| 2002/0128368 A1 * | 9/2002 | Adedeji | C08L 71/123 524/492 |
| 2009/0053959 A1 | 2/2009 | Datta et al. | |
| 2010/0249329 A1 | 9/2010 | Grein et al. | |
| 2011/0086970 A1 | 4/2011 | Grein et al. | |
| 2012/0208962 A1 | 8/2012 | Walton et al. | |

FOREIGN PATENT DOCUMENTS

| | | |
|---|---|---|
| EP | 0807145 | 9/2001 |
| WO | 97/20888 | 6/1997 |

* cited by examiner

THERMOPLASTIC POLYOLEFIN CONTAINING AMORPHOUS ETHYLENE ELASTOMER

PRIORITY CLAIM TO RELATED APPLICATIONS

This invention is a National Stage Application of International Application No. PCT/US2015/046252 filed Aug. 31, 2015, which claims priority to and the benefit of U.S. Ser. No. 62/060,142, filed Oct. 6, 2014, and EP application 14194811.7, filed Nov. 25, 2014, both incorporated by reference.

FIELD OF THE INVENTION

The present invention(s) relates to polypropylene-based thermoplastic polyolefin compositions containing an amorphous (substantially non-crystalline) ethylene copolymer, the composition having improved impact properties.

BACKGROUND OF THE INVENTION

Polypropylene-based Thermoplastic Olefin Compositions (TPO) are blends of polypropylene, an elastomer, optional propylene-based elastomers, and optional non-polymeric components such as fillers and other compounding ingredients. Typically, TPOs are multiphase polymer blends where a polypropylene forms a continuous matrix phase and the elastomer component, generally derived from an ethylene containing interpolymer, is the dispersed component. The polypropylene matrix imparts tensile strength and chemical resistance to the TPO, while the ethylene polymer imparts flexibility and impact resistance. Typically, TPOs have a dispersed phase which is not, or only modestly, cross-linked.

It has been observed that certain non-crosslinked TPO compositions have improved processability, and also improved mechanical properties, when the compositions contain high levels of isotactic polypropylene, for example, above 70 wt %. Generally, one of the problems with adding more isotactic polypropylene to any thermoplastic composition is a noticeable drop in ductility. For example, any improvement in a mechanical or impact property, such as Notched Izod, tends to be accompanied by an undesirably high loss of flexibility, for example, flexural modulus. Such a trade-off is of great concern for the makers of automotive parts, particularly car bumpers. Certain compositions described above provide a combination of (a) high Notched Izod together with (b) high flexural modulus. In addition to having superior mechanical properties, the compositions also have desirable molding properties, for example, sufficiently high MFR, without losing, their superior impact strength and flexibility.

Traditionally, very low density ethylene-propylene copolymers and ethylene-propylene-diene terpolymers have been used as the modifier component in TPO compositions, these EP or EPDMs generally have a high molecular weight expressed in Mooney units. Recently, other ethylene-alpha olefin copolymers have been used, especially very low density ethylene-butene, ethylene-hexene and ethylene-octene copolymers which generally have a lower molecular weight expressed in Melt Index units. The density of these latter polymers is generally less than 0.900 g/cm$^3$, indicative of some residual crystallinity in the polymer. The major market for TPOs is in the manufacture of automotive parts, especially bumper fascia. Other applications include automotive interior components such as door skin, air bag cover, side pillars and the like. These parts are generally made using an injection molding process. To increase efficiency and reduce costs it is necessary to decrease molding times and reduce wall thickness in the molds. To accomplish these goals, manufacturers have turned to high melt flow polypropylenes (Melt Flow Rate greater than 35 g/10 min). These high melt flow rate (MFR) resins are low in molecular weight and consequently difficult to toughen, resulting in products that have low impact strength.

There is a need therefore for TPO manufacturers to be able to broaden the scope of polymers available to manufacture end use items with a better balance between the performance of the hetero phase composition in its end use, the processability during conversion of the molten compositions into the end use article and the cost of providing those properties.

References of interest include U.S. Pat. Nos. 6,245,856; 6,288,171; 6,245,856; 6,232,402; 5,959,030; US 2009/053959; WO 97/20888; U.S. Ser. No. 14/325,449 filed Jul. 8, 2014, and EP 0 792 914.

SUMMARY OF THE INVENTION

Disclosed is a thermoplastic polyolefin composition comprising:
a polypropylene having a melting point temperature ($T_m$) of greater than 130° C. and a melt flow rate (230° C./2.16 kg) within the range from 10 g/10 min to 80 g/10 min;
an ethylene-propylene copolymer comprising within the range from 40 wt % to 80 wt % ethylene derived units and having a melt flow rate (230° C./2.16 kg) within the range from 0.1 g/10 min to 20 g/10 min, a Mw/Mn within the range from 1.8 to 4.0, and a weight average molecular weight (Mw) within a range of from 50,000 g/mole to 300,000 g/mole; and
a propylene-based elastomer having within the range from 5 to 25 wt % ethylene derived units and having a melting point temperature ($T_m$) of less than 110° C. and a Mw/Mn within the range from 2.0 to 4.0.

Hereinafter, all melting point temperatures refer to the first melt in the DSC cycle.

DETAILED DESCRIPTION OF THE INVENTION

Figure 1:
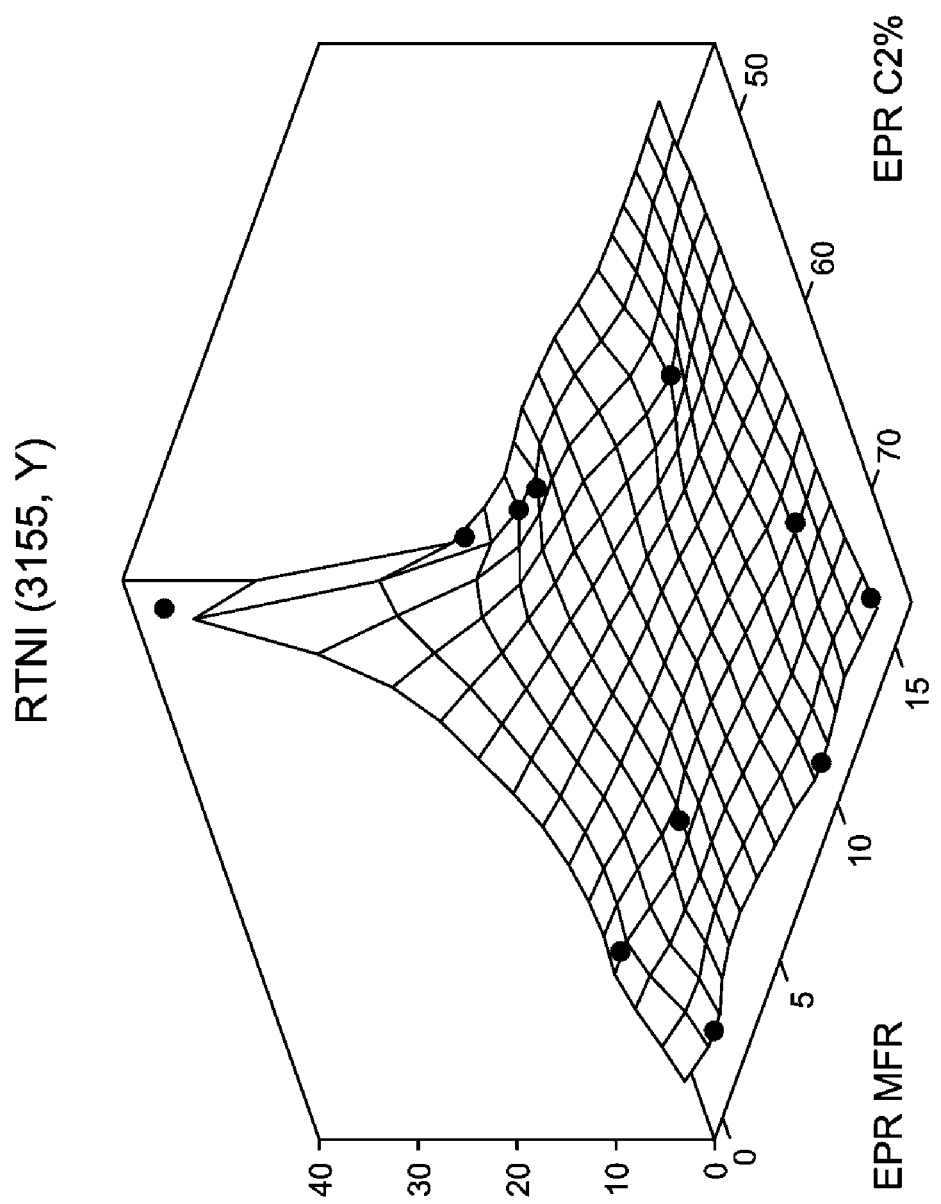
FIG. 1 is a graphical representation of Room Temperature (22° C.) Notched Izod data for blends of ethylene-propylene copolymer with 35 MFR PP and propylene-based elastomer.
Figure 2:
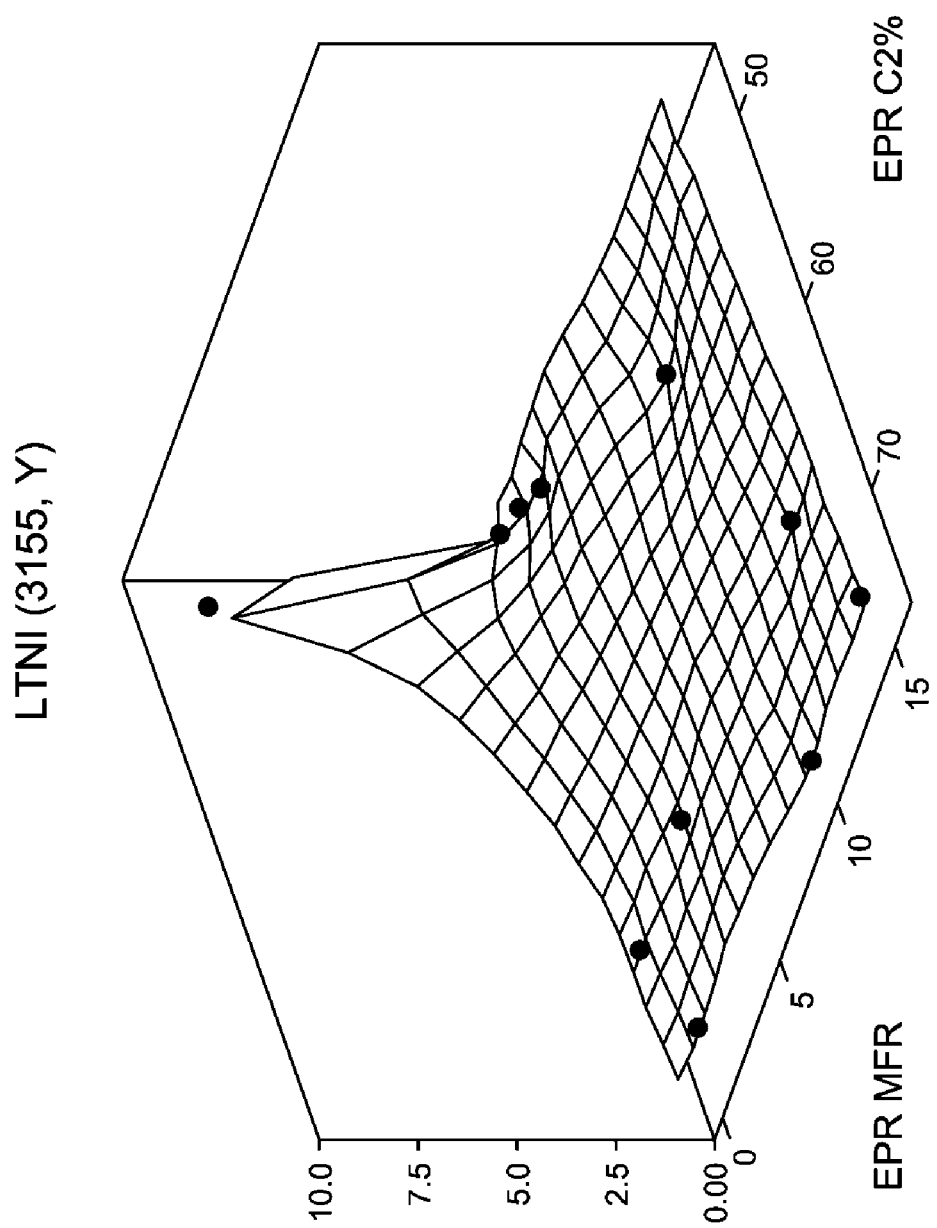
FIG. 2 is a graphical representation of −29° C. Notched Izod data for blends of ethylene-propylene copolymer with 35 MFR PP and propylene based elastomer.

Disclosed is a propylene-based TPO comprising at least polypropylene, an inventive ethylene-propylene copolymer, and optionally, a propylene-based elastomer. More particularly, the propylene-based TPO is a thermoplastic polyolefin composition comprising (or consisting essentially of) three different components, each of which may be a blend of two or more of the similar polymer compositions: a polypropylene having a melting point temperature ($T_m$) of greater than 130° C. and a melt flow rate (230° C./2.16 kg) within the range from 10 to 80 g/10 min; an ethylene-propylene copolymer comprising within the range from 40 to 80 wt % ethylene derived units and having a melt flow rate (230°

C./2.16 kg) within the range from 0.1 to 20 g/10 min; and a propylene-based elastomer having within the range from 5 to 25 wt % ethylene derived units and having a melting point temperature ($T_m$) of less than 110° C.

The composition is preferably a non-cured blend, but, as described the claimed TPO compositions and those described herein are the melt-blend product (or "cooled" melt-blend, such that the polymers have been melted to the temperature of the highest melting component, at least, and intimately blended, then allowed to cool to form the composition) of the at least three different polymer components (polypropylene, ethylene-propylene copolymer, and propylene-based elastomer). Preferably, the polypropylene is present within a range of from 50 wt % to 90 wt %; and the ethylene-propylene copolymer is present within a range from 10 wt % to 40 wt %; and wherein the propylene-based elastomer is present to within a range from 1.0 wt % to 10 wt %, each based on the weight of all ingredients of the composition. Most preferably, from 55 to 75 wt %, by weight of the composition, is the polypropylene and from 0.1 to 5 wt %, by weight of the composition, is the propylene-based elastomer, the remainder of the composition being the ethylene-propylene elastomer and any common additives as is known in the art. There may be some chemical "reaction" between the primary components, but most likely there is only a physical change in the formation of a "continuous" phase primarily of polypropylene and a "discontinuous" phase or "discrete" phase comprising mostly the ethylene-propylene copolymer. The three primary components are described here.

Ethylene-Propylene Copolymer

The ethylene-propylene copolymer may be a single polymer composition or may in fact be comprised of a blend of two or more ethylene-propylene copolymers that have properties within the defined region of parameters described herein, and in any case have an aggregate density less than 0.900 g/cm³. For instance, if two or more ethylene α-olefin polymers are combined to form the ethylene-propylene copolymer, they may be the same or different in their selection of comonomers and/or the amount of comonomer or comonomer amounts and/or densities, but overall, as a blend fall within with the claimed range of parameter(s).

The added polymer (one differing in density and or amount or type of comonomer from the copolymer described above) may be one generally used conventionally as modifier in TPOs, and as such may be generally lower in density than the first polymer described above. The amounts of such added or second polymer depend on the balance of effects desired. Generally lower density polymer may enhance properties such as impact strength. Such polymers of lower density include, but are not limited to polymers of having a density of less than 0.900, or 0.895, or 0.890, or 0.885, and/or 0.860, or 0.865 g/cm³.

The ethylene-propylene copolymers (either a single polymer or blends) may be present in the composition as a disperse phase in a continuous phase of the polypropylene component. Thus, the amount of ethylene-propylene ("EP") copolymer component should not exceed that needed to maintain its dispersed condition in the polypropylene component continuous phase. When such an upper limit is reached, (the upper boundary of maintaining a dispersed condition) additional amounts of ethylene-propylene copolymer will tend to result in the copolymer becoming a so-called "co-continuous phase" in which discrete, dispersed phase islands will coalesce into larger islands. This co-continuous state may be detrimental to physical properties, as the flexural modulus is lowered. To mitigate such effects, if larger amounts of EP copolymer are desired or required, a full or partial cross-linking can be elected. This full or partial cross-linking may decrease the tendency to co-continuity. Such cross-linking can be effected by chemical means (peroxide or sulfur or silane, azides, etc.) or by non-chemical means such as electron beam radiation. But preferably the TPO compositions described herein are not cross-linked, meaning that no agent is purposefully added that would effectuate a covalent linking between polymer chains or within the same polymer chain.

The sizes of the individual domains of the dispersed phase are generally small, with the smallest length dimension for the dispersed phase being less than 10 μm. This phase size of the dispersed phase may be maintained during processing even without crosslinking. The disperse phase is comprised of a mixture of the ethylene-propylene copolymer with some amount of the polypropylene component, due to thermodynamic mixing of polymers. The balance of the polymers not in this disperse phase makes up the continuous phase.

The one or more copolymers that make up the ethylene-propylene copolymer may be substantially free of propylene crystallinity, by which we intend <10 or <5 or <1 or 0 percent of propylene crystallinity is in the modifier component as determined by Differential Scanning calorimetry (DSC). The one or more ethylene-propylene copolymers may include C3 olefin derived units, in addition C4 to C20 derived units, and optionally the copolymers may contain diene derived units. Such combinations of ethylene and propylene as described above include, but are not limited to, copolymers such as ethylene-propylene; ethylene-propylene-butene-1; ethylene-propylene hexene-1; ethylene-propylene-pentene-1; ethylene-propylene-octene-1; and the like may be used as the polyethylene portion of the hetero phase polymer composition. The one or more α-olefin derived units may be present in the ethylene copolymer in an amount of greater than 30 mole percent based on the copolymer, or greater than 40 mole percent, or greater than 50 mole percent. If the optional diene is present, it may range from 0.5 to 10 wt %, or from 0.5 to 7 wt % (based on FTIR determination). The ethylene content of the copolymer may generally range from 30 to 65 wt %, or at most 40 to 60 wt % or more.

The EP copolymer generally may have a number average molecular weight (Mn), as determined by GPC, of from 30,000 to 500,000 or may be greater than 50,000 and/or less than 100,000 g/mole. The Melt Index may be from 0.03 to 20 g/10 minutes.

More particularly, the ethylene-propylene copolymer comprises within the range from 40, or 45 wt % to 55, or 60, or 65, or 80 wt % ethylene derived units, and has a melt flow rate (230° C./2.16 kg) within the range from 0.1, or 1, or 5 g/10 min to 8, or 10, or 12, or 20 g/10 min, a Mw/Mn within the range from 1.8, or 2.0 to 2.8, or 3.0, or 4.0, and a weight average molecular weight (Mw) within a range of from 50,000, or 60,000 g/mole to 120,000, or 200,000, or 300,000 g/mole. The ethylene-propylene copolymer also preferably has a high-load MFR within the range of from 100, or 120, or 140, or 160 g/10 min to 220, or 240, or 260, or 280 g/10 min. Also, most preferably, the ethylene-propylene copolymer has a melting point temperature ($T_m$) of less than 80 or 100° C. (first melt); preferably within a range of from −50, or −40, or −30, or −20° C. to 20, or 40, or 50, or 60° C. Also, most preferably the ethylene-propylene copolymer has a heat of fusion ($H_f$) of less than 40, or 50 J/g (first melt); preferably within a range of from 0 or 10, or 20 J/g to 40, or 50, or 60, or 70 J/g. Further, the ethylene-propylene copolymer most preferably has a glass transition temperature ($T_g$) within a range of from −80, or −60, or −50° C. to −30, or −20, or −10° C.

Such polymer can be produced using metallocene based catalyst or other single site catalysts systems in gas phase or solution processes. The metallocene based catalysts used for such polymerizations are generally of the metallocene-alumoxane, metallocene-ionizing activator type. Useful catalysts are those disclosed in EP 0 129 368; U.S. Pat. Nos. 5,026,798; and 5,198,401, each incorporated herein by reference. Most preferably, the ethylene-propylene copolymer is formed by a polymerization reaction between ethylene, an amount of comonomer selected from one or more of propylene, butylene, hexene and octene, and a bridged hafnocene or zirconocene, most preferably a bridged, unbalanced hafnocene or zirconocene. By "unbalanced" what is meant is that the two primary cyclopentadienyl ligands, or ligand isolobal to cyclopentadienyl, are not the same, such as a cyclopentadienyl-fluorenyl hafnocene or zirconocene, or a indenyl-fluorenyl hafnocene or zirconocene, etc.

The copolymer may or may not contain long chain branches, whose presence may be inferred from rheology type measurements such as melt tension and the internal energy of activation for melt flow. The ethylene-propylene copolymer may comprise polymers derived from cyclic mono-olefins such as styrene and both linear and cyclic dienes can also be used. For a discussion of such dienes, U.S. Pat. No. 6,245,846 is incorporated by reference. The ethylene-propylene copolymer can be linear, substantially linear, blocky or branched. For a discussion of such options, U.S. Pat. No. 6,245,846, which is incorporated by reference.

Propylene-Based Elastomer

The polymer blends used to form the TPOs described herein comprise one or more propylene-based elastomers ("PBEs"). The PBE comprises propylene and from 5 to 25 wt % of one or more comonomers selected from ethylene and/or $C_4$-$C_{12}$ α-olefins. The α-olefin comonomer units may be derived from ethylene, butene, pentene, hexene, 4-methyl-1-pentene, octene, or decene. In preferred embodiments the α-olefin is ethylene. In some embodiments, the propylene-based polymer composition consists essentially of propylene and ethylene, or consists only of propylene and ethylene. The embodiments described below are discussed with reference to ethylene as the α-olefin comonomer, but the embodiments are equally applicable to other copolymers with other α-olefin comonomers. In this regard, the copolymers may simply be referred to as propylene-based polymers with reference to ethylene as the α-olefin.

The PBE may include at least 5 wt %, at least 6 wt %, at least 7 wt %, or at least 8 wt %, or at least 9 wt %, or at least 10 wt %, or at least 12 wt % ethylene-derived units, where the percentage by weight is based upon the total weight of the propylene-derived and ethylene-derived units. The PBE may include up to 30 wt %, or up to 25 wt %, or up to 22 wt %, or up to 20 wt %, or up to 19 wt %, or up to 18 wt %, or up to 17 wt % ethylene-derived units, where the percentage by weight is based upon the total weight of the propylene-derived and ethylene-derived units. In some embodiments, the PBE may comprise from 5 to 25 wt % ethylene-derived units, or from 7 wt % to 20 wt % ethylene, or from 9 to 18 wt % ethylene-derived units, where the percentage by weight is based upon the total weight of the propylene-derived and ethylene-derived units.

The PBE may include at least 70 wt %, or at least 75 wt %, or at least 80 wt %, or at least 81 wt % propylene-derived units, or at least 82 wt %, or at least 83 wt % propylene-derived units, where the percentage by weight is based upon the total weight of the propylene-derived and α-olefin derived units. The PBE may include up to 95 wt %, or up to 94 wt %, or up to 93 wt %, or up to 92 wt %, or up to 90 wt %, or up to 88 wt % propylene-derived units, where the percentage by weight is based upon the total weight of the propylene-derived and α-olefin derived units.

The $T_m$ of the PBE (as determined by DSC) may be less than 115° C., or less than 110° C., or less than 100° C., or less than 95° C., or less than 90° C. In some embodiments, the PBE may have two melting peaks as determined by DSC. In other embodiments, the PBE may have a single melting peak as determined by DSC.

The PBE may be characterized by its heat of fusion (Hf), as determined by DSC. The PBE may have an Hf that is at least 0.5 J/g, or at least 1.0 J/g, or at least 1.5 J/g, or at least 3.0 J/g, or at least 4.0 J/g, or at least 5.0 J/g, or at least 6.0 J/g, or at least 7.0 J/g. The PBE may be characterized by an Hf of less than 75 J/g, or less than 70 J/g, or less than 60 J/g, or less than 50 J/g, or less than 45 J/g, or less than 40 J/g, or less than 35 J/g, or less than 30 J/g, or less than 25 J/g.

The DSC procedures for determining $T_m$ and Hf of the PBE include the following. The polymer is pressed at a temperature of from 200° C. to 230° C. in a heated press, and the resulting polymer sheet is hung, under ambient conditions, in the air to cool. 6 to 10 mg of the polymer sheet is removed with a punch die. This 6 to 10 mg sample is annealed at room temperature (22° C.) for 80 to 100 hours. At the end of this period, the sample is placed in a DSC (Perkin Elmer Pyris One Thermal Analysis System) and cooled to −30° C. to −50° C. and held for 10 minutes at that temperature. The sample is heated at 10° C./min to attain a final temperature of 200° C. The sample is kept at 200° C. for 5 minutes. Then a second cool-heat cycle is performed. Events from both cycles are recorded. The thermal output is recorded as the area under the melting peak of the sample, which typically occurs between 0° C. and 200° C. It is measured in Joules and is a measure of the Hf of the polymer.

Preferably, the propylene-based elastomer has within the range from 12 to 20 wt % ethylene derived units and having a melting point temperature ($T_m$) of less than 110° C. Most preferably, the propylene-based elastomer has a melting point temperature ($T_m$) within the range of from 80, or 90° C. to 110° C. (first melt).

The PBE can have a triad tacticity of three propylene units (mmm tacticity), as measured by 13C NMR, of 75% or greater, 80% or greater, 85% or greater, 90% or greater, 92% or greater, 95% or greater, or 97% or greater. In one or more embodiments, the triad tacticity may range from 75 to 99%, or from 80 to 99%, or from 85 to 99%, or from 90 to 99%, or from 90 to 97%, or from 80 to 97%. Triad tacticity is determined by the methods described in U.S. Pat. No. 7,232,871. The PBE may have a tacticity index m/r ranging from a lower limit of 4 or 6 to an upper limit of 8 or 10 or 12.

The PBE may have a % crystallinity of from 0.5% to 40%, or from 1% to 30%, or from 5% to 25%, determined according to DSC procedures.

The PBE may have a density of from 0.85 g/cm³ to 0.92 g/cm³, or from 0.86 g/cm³ to 0.90 g/cm³, or from 0.86 g/cm³ to 0.89 g/cm³ at 22° C., as measured per the ASTM D-792 test method.

The PBE can have a melt index (MI) (ASTM D-1238, 2.16 kg at 190° C.), of less than or equal to 100 g/10 min, or less than or equal to 50 g/10 min, or less than or equal to 25 g/10 min, or less than or equal to 10 g/10 min, or less than or equal to 9.0 g/10 min, or less than or equal to 8.0 g/10 min, or less than or equal to 7.0 g/10 min.

The PBE may have a melt flow rate (MFR), as measured according to ASTM D-1238 (2.16 kg weight at 230° C.), greater than 1 g/10 min, or greater than 2 g/10 min, or greater than 5 g/10 min, or greater than 8 g/10 min, or greater than 10 g/10 min. The PBE may have an MFR less than 1,000 g/10 min, or less than 750 g/10 min, or less than 500 g/10 min, or less than 400 g/10 min, or less than 300 g/10 min, or less than 200 g/10 min, or less than 100 g/10 min, or less than 75 g/10 min, or less than 50 g/10 min. In some embodiments, the PBE may have an MFR from 1 to 100 g/10 min, or from 2 to 75 g/10 min, or from 5 to 50 g/10 min.

In some embodiments, the PBE may be a reactor grade polymer, as defined above. In other embodiments, the PBE may be a polymer that has been visbroken after exiting the reactor to increase the MFR.

The PBE may have a g' index value of 0.95 or greater, or at least 0.97, or at least 0.99, wherein g' is measured at the Mw of the polymer using the intrinsic viscosity of isotactic polypropylene as the baseline. For use herein, the g' index is defined as:

$$g' = \frac{\eta_b}{\eta_l}$$

where $\eta b$ is the intrinsic viscosity of the polymer and $\eta l$ is the intrinsic viscosity of a linear polymer of the same viscosity-averaged molecular weight (Mv) as the polymer. $\eta l = KMv\alpha$, K and $\alpha$ are measured values for linear polymers and should be obtained on the same instrument as the one used for the g' index measurement.

The PBE may have a weight average molecular weight (Mw) of from 50,000 to 5,000,000 g/mol, or from 75,000 to 1,000,000 g/mol, or from 100,000 to 500,000 g/mol, or from 125,000 to 300,000 g/mol. Most preferably, the weight average molecular weight (Mw) of the propylene-based elastomer is at least 150,000 g/mole; or within a range from 150,000, or 200,000 g/mole to 300,000, or 400,000, or 500,000 g/mole.

The PBE may have a number average molecular weight (Mn) of from 2,500 to 2,500,000 g/mol, or from 5,000 to 500,000 g/mol, or from 10,000 to 250,000 g/mol, or from 25,000 to 200,000 g/mol. The PBE may have a Z-average molecular weight (Mz) of from 10,000 to 7,000,000 g/mol, or from 50,000 to 1,000,000 g/mol, or from 80,000 to 700,000 g/mol, or from 100,000 to 500,000 g/mol. The molecular weight distribution (MWD, equal to Mw/Mn) of the PBE may be from 1 to 40, or from 1 to 15, or from 1.8 to 5, or from 1.8 to 3.

Optionally, the propylene-based polymer compositions may also include one or more dienes. In embodiments where the propylene-based polymer compositions comprises a diene, the diene may be present at from 0.05 wt % to 6 wt % diene-derived units, or from 0.1 wt % to 5.0 wt % diene-derived units, or from 0.25 wt % to 3.0 wt % diene-derived units, or from 0.5 wt % to 1.5 wt % diene-derived units, where the percentage by weight is based upon the total weight of the propylene-derived, alpha-olefin derived, and diene-derived units.

In one or more embodiments, the PBE can optionally be grafted (i.e., "functionalized") using one or more grafting monomers. As used herein, the term "grafting" denotes covalent bonding of the grafting monomer to a polymer chain of the PBE. The grafting monomer can be or include at least one ethylenically unsaturated carboxylic acid or acid derivative, such as an acid anhydride, ester, salt, amide, imide, acrylates or the like. Illustrative monomers include but are not limited to acrylic acid, methacrylic acid, maleic acid, fumaric acid, itaconic acid, citraconic acid, mesaconic acid, maleic anhydride, 4-methyl cyclohexene-1,2-dicarboxylic acid anhydride, bicyclo(2.2.2)octene-2,3-dicarboxylic acid anhydride, 1,2,3,4,5,8,9,10-octahydronaphthalene-2,3-dicarboxylic acid anhydride, 2-oxa-1,3-diketospiro(4.4)nonene, bicyclo(2.2.1)heptene-2,3-dicarboxylic acid anhydride, maleopimaric acid, tetrahydrophthalic anhydride, norbornene-2,3-dicarboxylic acid anhydride, nadic anhydride, methyl nadic anhydride, himic anhydride, methyl himic anhydride, and 5-methylbicyclo(2.2.1)heptene-2,3-dicarboxylic acid anhydride. Other suitable grafting monomers include methyl acrylate and higher alkyl acrylates, methyl methacrylate and higher alkyl methacrylates, acrylic acid, methacrylic acid, hydroxy-methyl methacrylate, hydroxyl-ethyl methacrylate and higher hydroxy-alkyl methacrylates and glycidyl methacrylate. Maleic anhydride is a preferred grafting monomer. In one or more embodiments, the grafted PBE comprises from 0.5 to 10 wt % ethylenically unsaturated carboxylic acid or acid derivative, more preferably from 0.5 to 6 wt %, more preferably from 0.5 to 3 wt %; in other embodiments from 1 to 6 wt %, more preferably from 1 to 3 wt %. In a preferred embodiment, wherein the graft monomer is maleic anhydride, the maleic anhydride concentration in the grafted polymer is preferably in the range of 1 to 6 wt %, preferably at least 0.5 wt %, and highly preferably 1.5 wt %.

In some embodiments, the PBE is a reactor blend of a first polymer component and a second polymer component. Thus, the comonomer content of the PBE can be adjusted by adjusting the comonomer content of the first polymer component, adjusting the comonomer content of second polymer component, and/or adjusting the ratio of the first polymer component to the second polymer component present in the propylene-based polymer composition. In such embodiments, the first polymer component may comprise propylene and ethylene and have an ethylene content of greater than 10 wt % ethylene, or greater than 12 wt % ethylene, or greater than 13 wt % ethylene, or greater than 14 wt % ethylene, or greater than 15 wt % ethylene, and an ethylene content that is less than 20 wt % ethylene, or less than 19 wt % ethylene, or less than 18 wt % ethylene, or less than 17 wt % ethylene, or less than 16 wt % ethylene, where the percentage by weight is based upon the total weight of the propylene-derived and ethylene derived units of the first polymer component. In such embodiments, the second polymer component may comprise propylene and ethylene and have an ethylene content of greater than 2 wt % ethylene, or greater than 3 wt % ethylene, or greater than 4 wt % ethylene, or greater than 5 wt % ethylene, or greater than 6 wt % ethylene, and an ethylene content that is less than 10 wt % ethylene, or less than 9.0 wt % ethylene, or less than 8 wt % ethylene, or less than 7 wt % ethylene, or less than 6 wt % ethylene, or less than 5 wt % ethylene, where the percentage by weight is based upon the total weight of the propylene-derived and ethylene derived units of the second polymer component. In such embodiments, the PBE may comprise from 3 to 25 wt % of the second polymer component, or from 5 to 20 wt % of the second polymer component, or from 7 to 18 wt % of the second polymer component, or from 10 to 15 wt % of the second polymer component, and from 75 to 97 wt % of the first polymer component, or from 80 to 95 wt % of the first polymer component, or from 82 to 93 wt % of the first polymer component, or from 85 to 90 wt % of the first polymer component, based on the weight of the PBE.

Polymerization of the PBE is conducted by reacting monomers in the presence of a catalyst system described herein at a temperature of from 0° C. to 200° C. for a time of from 1 second to 10 hours. Preferably, homogeneous conditions are used, such as a continuous solution process or a bulk polymerization process with excess monomer used as diluent. The continuous process may use some form of agitation to reduce concentration differences in the reactor and maintain steady state polymerization conditions. The heat of the polymerization reaction is preferably removed by cooling of the polymerization feed and allowing the polymerization to heat up to the polymerization, although internal cooling systems may be used.

Further description of exemplary methods suitable for preparation of the PBEs described herein may be found in U.S. Pat. Nos. 6,881,800; 7,803,876; 8,013,069; and 8,026,323.

The triad tacticity and tacticity index of the PBE may be controlled by the catalyst, which influences the stereoregularity of propylene placement, the polymerization temperature, according to which stereoregularity can be reduced by increasing the temperature, and by the type and amount of a comonomer, which tends to reduce the level of longer propylene derived sequences.

Too much comonomer may reduce the crystallinity provided by the crystallization of stereoregular propylene derived sequences to the point where the material lacks strength; too little and the material may be too crystalline. The comonomer content and sequence distribution of the polymers can be measured using $^{13}C$ nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, 47 APPLIED SPECTROSCOPY 1128-1130 (1993). For a propylene ethylene copolymer containing greater than 75 wt % propylene, the comonomer content (ethylene content) of such a polymer can be measured as follows: A thin homogeneous film is pressed at a temperature of 150° C. or greater, and mounted on a Perkin Elmer PE 1760 infrared spectrophotometer. A full spectrum of the sample from 600 cm$^{-1}$ to 4000 cm$^{-1}$ is recorded and the monomer wt % of ethylene can be calculated according to the following equation: Ethylene wt %=82.585−111.987X+30.045X$^2$, where X is the ratio of the peak height at 1155 cm$^{-1}$ and peak height at either 722 cm$^{-1}$ or 732 cm$^{-1}$, whichever is higher. For propylene ethylene copolymers having 75 wt % or less propylene content, the comonomer (ethylene) content can be measured using the procedure described in Wheeler and Willis. Reference is made to U.S. Pat. No. 6,525,157, whose test methods are also fully applicable for the various measurements referred to in this specification and claims and which contains more details on GPC measurements, the determination of ethylene content by NMR and the DSC measurements.

The catalyst systems used for producing the PBE may comprise a metallocene compound. In any embodiment, the metallocene compound may be a bridged bisindenyl metallocene having the general formula (In$^1$)Y(In$^2$)MX$_2$, where In$^1$ and In$^2$ are identical substituted or unsubstituted indenyl groups bound to M and bridged by Y, Y is a bridging group in which the number of atoms in the direct chain connecting In$^1$ with In$^2$ is from 1 to 8 and the direct chain comprises C, Si, or Ge; M is a Group 3, 4, 5, or 6 transition metal; and X$_2$ are leaving groups. In$^1$ and In$^2$ may be substituted or unsubstituted. If In$^1$ and In$^2$ are substituted by one or more substituents, the substituents are selected from the group consisting of a halogen atom, C$_1$ to C$_{10}$ alkyl, C$_5$ to C$_{15}$ aryl, C$_6$ to C$_{25}$ alkylaryl, and Si-, N- or P-containing alkyl or aryl. Each leaving group X may be an alkyl, preferably methyl, or a halide ion, preferably chloride or fluoride. Exemplary metallocene compounds of this type include, but are not limited to, μ-dimethylsilylbis(indenyl) hafnium dimethyl and μ-dimethylsilylbis(indenyl) zirconium dimethyl.

Suitable PBEs for use in the present invention include Vistamaxx™ grades available from ExxonMobil Chemical, including Vistamaxx™ 7050 and Vistamaxx™ 6202.

Polypropylene

The "polypropylene" that is preferably used in the compositions is a homopolymer or copolymer comprising from 60 wt % or 70 wt % or 80 wt % or 85 wt % or 90 wt % or 95 wt % or 98 wt % or 99 wt % to 100 wt % propylene-derived units; comprising within the range of from 0 wt % or 1 wt % or 5 wt % to 10 wt % or 15 wt % or 20 wt % or 30 wt % or 40 wt % C$_2$ and/or C$_4$ to C$_{10}$ α-olefin derived units; and can be made by any desirable process using any desirable catalyst as is known in the art, such as a Ziegler-Natta catalyst, a metallocene catalyst, or other single-site catalyst, using solution, slurry, high pressure, or gas phase processes. Certain polypropylenes that find use as the compositions have within the range from 0.2 wt % or 0.5 wt % to 1 wt % or 2 wt % or 5 wt % ethylene-derived units. Polypropylene copolymers are useful polymers in certain embodiments, especially copolymers of propylene with ethylene and/or butene, and comprise propylene-derived units within the range of from 70 wt % or 80 wt % to 95 wt % or 98 wt % by weight of the polypropylene. In any case, useful polypropylenes have a DSC melting point (ASTM D3418) of at least 130° C. or 140° C. or 150° C. or 160° C. or 165° C., or within a range of from 130° C. or 135° C. or 140° C. to 150° C. or 160° C. or 170° C. A "highly crystalline" polypropylene is preferred in certain embodiments of the inventive compositions, and is typically isotactic and comprises 100 wt % propylene-derived units (propylene homopolymer) and has a relatively high melting point of from greater than (greater than or equal to) 130° C. or 140° C. or 145° C. or 150° C. or 155° C. or 160° C. or 165° C.

The term "crystalline," as used herein, characterizes those polymers which possess high degrees of inter- and intra-molecular order. Preferably, the polypropylene has a heat of fusion (H$_f$) greater than 60 J/g or 70 J/g or 80 J/g, as determined by DSC analysis. The heat of fusion is dependent on the composition of the polypropylene; the thermal energy for the highest order of polypropylene is estimated at 189 J/g, that is, 100% crystallinity is equal to a heat of fusion of 189 J/g. A polypropylene homopolymer will have a higher heat of fusion than a copolymer or blend of homopolymer and copolymer. Also, the polypropylenes useful in the inventive compositions may have a glass transition temperature (ISO 11357-1, Tg) preferably between −20° C. or −10° C. or 0° C. to 10° C. or 20° C. or 40° C. or 50° C. Preferably, the polypropylenes have a Vicat softening temperature (ISO 306, or ASTM D 1525) of greater than 120° C. or 110° C. or 105° C. or 100° C., or within a range of from 100° C. or 105° C. to 110° C. or 120° C. or 140° C. or 150° C., or a particular range of from 110° C. or 120° C. to 150° C.

Preferably, the polypropylene has a melt flow rate ("MFR", 230° C., 2.16 kg, ASTM D1238) within the range from 10, or 18 g/10 min to 40, or 50, or 60, or 80, g/10 min. Also, the polypropylene may have a molecular weight distribution (determined by GPC) of from 1.5 or 2.0 or 2.5 to 3.0 or 3.5 or 4.0 or 5.0 or 6.0 or 8.0 in certain embodiments. Suitable grades of polypropylene that are useful in the compositions described herein include those made by ExxonMobil, LyondellBasell, Total, Borealis, Japan Polypropylene, Mitsui, and other sources. A description of semicrystalline polypropylene polymers and reactor copolymers can be found in "Polypropylene Handbook", (E. P. Moore Editor, Carl Hanser Verlag, 1996).

In embodiments of the inventive compositions, the polypropylene component may be a so-called impact copolymer (ICP). Such ICPs are themselves two phase systems, however in the present heterophase blends, each of the two individual phases of the ICP may generally blend with the respective phase of the blend, i.e., crystalline and/or amorphous. As indicated, an ICP can be in the polypropylene component as part—or all—of the polypropylene component, used in combinations with the other components of the hetero phase composition. The polypropylene homopolymer portion of the ICPs have melt flow rates (MFR) (determined by the ASTM D1238 technique, condition L) in the range of from 15 to 200, or at least 15 and/or less than 120 dg/min. Exemplary α-olefins for the rubber portion of the ICP, may be selected from one or more of ethylene, propylene; and C4 to C20 α-olefins such as 1-butene; 1-pentene, 2-methyl-1-pentene, 3-methyl-1-butene; 1-hexene, 3-methyl-1-pentene, 4-methyl-1-pentene; 3,3-dimethyl-1-butene; 1-heptene; 1-hexene; methyl-1-hexene; dimethyl-1-pentene; trimethyl-1-butene; ethyl-1-pentene; 1-octene; methyl-1-pentene; dimethyl-1-hexene; trimethyl-1-pentene; ethylhexene-1; methylethyl-1-pentene; diethyl-1-butene; 1-propyl-1-pentene; 1-decene; methyl-1-nonene; 1-nonene; dimethyl-1-octene; trimethyl-1-heptene; 1-ethyl-1-octene; methylethyl-1-butene; diethyl-1-hexene; 1-dodecene, and 1-hexadodecene.

Suitably, if ethylene is the α-olefin in the rubber phase of the ICP, it may be present in the range of from 25 to 70 wt %, or at least 30 and/or less than 65 wt % based on the weight of the rubber phase. The rubber phase may be present in the ICP in the range of from 4 to 20 wt %, or at least 6 or 10 wt % and/or less than 18 wt %, all based on the total weight of the ICP. The MFR of the ICP may be in the range of from 15 to 60, or may be at least 20 and/or less than 50 or less than 40 dg/min.

The ICP may be a physical blend of iPP and EP rubber, or a so-called reactor blend. In any case, the ICP is a blend of polypropylene and one or more elastomeric polymers of the ethylene α-olefin type, generally ethylene propylene elastomeric polymers. The ICP useful in embodiments of our invention may be prepared by conventional polymerization techniques such as a two-step gas phase process using Ziegler-Natta catalysis. For example, see U.S. Pat. No. 4,379,759 which is fully incorporated by reference. The ICPs of embodiments of our invention are preferably produced in reactors operated in series, and the second polymerization, may be carried out in the gas phase. The first polymerization, may be a liquid slurry or solution polymerization process. Metallocene catalyst systems may be used to produce the ICP compositions useful in embodiments of our invention. Current particularly suitable metallocenes are those in the generic class of bridged, substituted bis(cyclopentadienyl) metallocenes, specifically bridged, substituted bis(indenyl) metallocenes known to produce high molecular weight, high melting, highly isotactic propylene polymers. Generally speaking, those of the generic class disclosed in U.S. Pat. No. 5,770,753 (fully incorporated herein by reference) should be suitable.

Composition

The inventive compositions show improvements over previous TPO's comprising EP copolymer and polypropylene. For example, the same composition without the propylene-based elastomer cracked (lost ductility) at less than 0.90 ft-lb/in$^2$ (1.9 kJ/m$^2$) at −29° C. Desirably, the inventive compositions only partially break or there is no break at −29° C. (ASTM D256) with Notched Izod Force of between 1.0, or 4.0, or 6.0, to 10, or 12 ft-lb/in$^2$ (2.1, or 8.4, or 12.6, or 21, or 25 kJ/m$^2$). See below for a description of "partial break" and "no break." Also, the composition preferably only partially breaks or there is no break at 22° C. (ASTM D256) with Notched Izod Force of between 10, or 15, or 20 to 30, or 40 ft-lb/in$^2$ (21, or 32, or 42, or 63, or 84 kJ/m$^2$). Preferably, the inventive compositions have a 1% Secant Flexural Modulus (0.05 in/min, D790 ProA) within a range of from 600 or 700 or 750 MPa to 850 or 900 or 950 or 1000 or 1100 MPa, or greater than 600 or 700 or 800 or 850 MPa.

Additives may by present in the compositions described herein and are preferably present, if at all, to an extent that does not negatively influence the impact or modulus of the composition or components made from the composition. By "consisting essentially of", what is meant is that the composition may include one or more additives as is known in the art as long as the claimed properties are not altered such that they fall outside the scope of those claimed properties; and by "consisting of" what is meant is that the compositions include additives to a level no greater than 1 wt % or 2 wt % or 3 wt % of the total weight of the composition, or alternatively, additives are not measurably present. The "additives" include fillers (especially, silica, glass fibers, talc, etc.) colorants, whitening agents, cavitation agents, antioxidants, anti-slip agents, antifogging agents, nucleating agents, stabilizers, and mold release agents. Primary and secondary antioxidants include, for example, hindered phenols, hindered amines, and phosphates. Nucleating agents include, for example, sodium benzoate and talc. Dispersing agents such as AcroWax C can also be included. Slip agents include, for example, oleamide and erucamide. Catalyst deactivators are also commonly used, for example, calcium stearate, hydrotalcite, and calcium oxide.

The inventive compositions are most often described as a combination of its components and the properties of those components, but preferably the composition has a total ethylene (ethylene-derived monomer units) content within the range of 6, or 10, or 12 to 16, or 18, or 20, or 24 wt % The composition can be used to form any number of articles, which typically includes melt blending the components described herein and forming them into articles either before or after allowing the melt to cool. The "cooled melt blend" is thus the reaction product of melt blending the components, taking into account the possibility that there could be some transformation of one or more of the components facilitated by the heating and/or mixing process. Automotive components can preferably be made from the inventive thermoplastic polyolefin compositions, such as dash board components, interior side-door panels, instrument panels, air bag covers, or exterior components such as bumpers or bumper fascia, side panels, front bumpers and other components of the automobile. These components can be made by any desirable method, but preferably made by injection molding. Thus, an aspect of the disclosure herein is to a method of injection molding an automotive component comprising the melt extrusion and injection into a mold the inventive thermoplastic polyolefin compositions.

The various descriptive elements and numerical ranges disclosed herein for the inventive compositions can be combined with other descriptive elements and numerical ranges to describe the invention(s); further, for a given element, any upper numerical limit can be combined with any lower numerical limit described herein, including the examples. The features of the invention are demonstrated in the following non-limiting examples.

EXAMPLES

Tests

The thermoplastic olefin compounds of embodiments of the invention were formulated either in a 30-mm ZSK twin screw extruder.

Compounding in the twin screw extruder was accomplished using an intense mixing screw element. The batch size was 5000 gm. The temperature profile in the various extruder zones was ramped progressively from 170° C. to 210° C. The compounds discharged from the extruder were pelletized.

Standard test specimens conforming to ASTM specifications were prepared through injection molding on a 300-ton Van Dom press. The nozzle, front and rear temperatures of the injection molding equipment were maintained at 190° C. The mold temperature was kept constant at 27° C. The total cycle time was 54 seconds and the injection pressure was 4 MPa. A family mold containing various ASTM specimen cavities was used. The ExxonMobil Test method is described in T. C. Yu "Impact Modification of Polypropylenes with Exact Plastomers", Soc. of Plastics Engineers, ANTEC (May 1994).

For this test method, high-speed puncture testing based on ASTM D256-10 was used to study impact behavior. This test continuously measures the applied force and time during the impact event. The electronically collected data points are next processed through a computer to provide graphic representation of both force and energy as a function of displacement.

A drop-weight tester, Ceast Fractovis, was used to gather the data. It consists of three main parts: clamp assembly, plunger assembly, and IBM PC based control unit. Two parallel rigid plates with a large opening to expose the test specimen form the clamp assembly. Both the top and bottom plates are of the same dimension. The plunger assembly consists of a steel rod with a removable hemispherical tip to hold the measuring strain gauge. It is located perpendicular to and centered on the clamp hole. A control unit regulates the plunger test speed, as well as records the load and displacement data. Similar to the conventional Notched Izod testing, the test geometries need to be carefully defined because they are not precisely specified in the ASTM procedure. A 20 mm diameter hemispherical striker and a 40 mm opening clamp were used for this study. The test speed was set at 4 m/sec. For sub-ambient temperature testing, test specimens were chilled in a freezer for four hours at the test temperature. They were then stored in a liquid nitrogen cooled test chamber underneath the clamp assembly for further conditioning before testing. A force-displacement graph may be generated for a ductile material. Integration of the force displacement curve, in turn, yields an energy-displacement curve. Initially, a ductile material may behave as elastic solid in that deformation is proportional to the displacement. The initial slope of the generated graph is therefore a measure of the sample stiffness. After the elastic region, the sample starts to yield to the advancing plunger. At the yield point, the sample exerts its maximum resistance, the yield point is therefore the highest point on the force-displacement curve.

Afterwards, the high speed plunger initiates a crack in the sample and starts its downward penetration of the test specimen. The sample then starts to draw to accommodate the advancing plunger. Finally the plunger punctures through the test specimen; and, lastly, a small amount of energy is needed to overcome the friction between the test plunger and the plastic sample. Because of the large extent of this sample drawing, the total energy is approximately twice the yield energy. A ductility index (DI) can be defined as: DI=[(Total Energy-Yield Energy)/Yield Energy]×100]. The codes in the tables for the failure modes are as follows: C=complete break, H=hinged crack/break (an incomplete break such that one part of the specimen cannot support itself above the horizontal when the other part is held vertically), P=partial break (a break that does not meet the definition of a hinged break, but has a fracture of at least 90% of the distance between the vertex of the notch and the opposite side of the specimen), NB=no break. Other test methods are listed in the Table below:

| Tests | Method |
|---|---|
| Notched Izod Impact $(J/m^2)$ ft-lb/in$^2$ | ASTM D 256 |
| 1% Secant Modulus (MPa) psi | ASTM D 790 A |
| Melt Flow Rate (g/10 min) | ASTM D 1238, Condition L (230° C.), at 2.16 kg |
| High Load-Melt Flow Rate (g/10 min) | ASTM D 1238, Condition L (230° C.), at 21.6 kg |
| Crystalline Melting Point (abbreviated $T_m$) | Differential Scanning Calorimetry (DSC). Heating and cooling rates were 10° C./minute. $T_m$ is the temperature at which a maximum occurs in the heat absorption curve. |
| Glass Transition temperature (Tg) | DSC, ASTM E-1356, at a heating rate of 5° C./minute |

Preparation of the Ethylene-Propylene Copolymer.

All ethylene-propylene copolymer compositions in the examples were synthesized in one continuous stirred tank reactor. The polymerization was performed in solution, using hexane as the solvent. In the reactor, polymerization was performed at a temperature of 110 to 115° C., an overall pressure of 20 bar and ethylene and propylene feed rates of 1.3 kg/hr and 2 kg/hr, respectively. As catalyst, N,N-dimethylanilinium tetrakis(pentafluorophenyl) boron was used as an activator compound to activate the di(p-triethylsilylphenyl) methenyl[(cyclopentadienyl)(2,7-di-tert-butylfluorenyl)] hafnium dimethyl. In the process, hydrogen addition and temperature control were used to achieve the desired MFR. The catalyst, activated externally to the reactor, was added as needed in amounts effective to maintain the target polymerization temperature.

The copolymer solution emerging from the reactor was stopped from further polymerization by addition of water and then devolatilized using conventionally known devolatilization methods such as flashing or liquid phase separation, first by removing the bulk of the hexane to provide a concentrated solution, and then by stripping the remainder of the solvent in anhydrous conditions using a devolatilizer or a twin screw devolatilizer extruder so as to end up with a molten polymer composition containing less than 0.5 wt % of solvent and other volatiles. The molten polymer was cooled until solid. The composition and its melt flow rate (ASTM D1238, 230° C./2.16 kg; and 230° C./21.6 kg) are shown in Table 1 along with DSC measured parameters.

Various properties of the ethylene-propylene copolymers useful in the composition herein are described in Tables 1A to 1C.

TABLE 1A

Types of Ethylene-propylene copolymer used

| | A1 | A2 | A3 | A4 | A5 | A6 | A7 | A8 | A9 | A10 |
|---|---|---|---|---|---|---|---|---|---|---|
| Mw, g/mol | 92,958 | 96,720 | 100,016 | 110,133 | 74,883 | 65,983 | 73,675 | 94,434 | 77,890 | 80,194 |
| Mw/Mn | 2.25 | 2.20 | 2.22 | 2.03 | 2.28 | 2.23 | 2.08 | 2.23 | 2.24 | 2.18 |
| $C_2$, wt % | 48.98 | 45.65 | 46.00 | 49.94 | 70.41 | 72.57 | 72.44 | 76.42 | 66.82 | 79.28 |
| MFR, g/10 min (2.16 kg) | 5.53 | 5.97 | 5.61 | 2.90 | 6.40 | 8.32 | 6.61 | 1.49 | 4.99 | 2.64 |
| $T_m$, ° C. (1$^{st}$ melt) | −35.0 | n/a | n/a | −34.3 | 43.6 | 44.8 | 44.3 | 48.6 | 15.0 | 55.5 |
| Hf, J/g (1$^{st}$ melt) | 0.4 | n/a | n/a | 2.1 | 45.0 | 58.5 | 52.4 | 70.4 | 44.0 | 73.6 |
| Tc, ° C. (2$^{nd}$ cool) | −50.6 | n/a | n/a | −48.1 | 14.6 | 18.5 | 18.1 | 37.9 | 11.6 | 44.6 |
| Hc, J/g (2$^{nd}$ cool) | 2.4 | n/a | n/a | 3.4 | 46.4 | 52.1 | 43.8 | 61.4 | 36.2 | 59.6 |
| $T_m$, ° C. (2$^{nd}$ melt) | −36.4 | n/a | n/a | −35.0 | 19.2 | 30.2 | 29.9 | 48.5 | 11.0 | 53.8 |
| Hf, J/g (2$^{nd}$ melt) | 0.6 | n/a | n/a | 2.3 | 46.5 | 51.2 | 51.1 | 63.5 | 43.3 | 67.9 |
| Tg, ° C. | −58.6 | −57.5 | −57.6 | −58.3 | −48.1 | −45.0 | −37.1 | −40.3 | −48.1 | −40.3 |

TABLE 1B

Types of Ethylene-propylene copolymer used

| | B1 | B2 | B3 | B4 | B5 | B6 |
|---|---|---|---|---|---|---|
| Mw | 82,000 | 71,000 | 97,000 | 80,000 | 89,000 | 99,000 |
| Mw/Mn | 1.84 | 1.85 | 1.95 | 1.93 | 2.07 | 2.00 |
| $C_2$ (wt %) | 63.6 | 70.5 | 59.0 | 69.2 | 62.3 | 74.2 |
| MFR (2.16 kg) | 9.2 | 13.0 | 15.0 | 12.0 | 12.0 | 15.0 |
| HL-MFR (21.6 kg) | 175 | 238 | 280 | 239 | 259 | 111 |
| $T_m$ (° C.) (1$^{st}$ melt) | −1.3 | 45.5 | −17.7 | 43.5 | −6.0 | 47.9 |
| Hf (J/g) (1$^{st}$ melt) | 26.6 | 35.9 | 22.9 | 38.4 | 25.7 | 45.3 |
| Tc (° C.) (2$^{nd}$ cool) | −2.3 | 13.8 | −17.5 | 12.4 | −6.3 | 17.7 |
| Hc (J/g) (2$^{nd}$ cool) | 30.9 | 43.7 | 29.6 | 45.1 | 37.5 | 51.8 |
| $T_m$ (° C.) (2$^{nd}$ melt) | −3.2 | 28.3 | −17.8 | 24.5 | −6.8 | 35.6 |
| Hf (J/g) (2$^{nd}$ melt) | 41.5 | 38.4 | 29.7 | 39.9 | 32.7 | 45.7 |

TABLE 1C

Types of Ethylene-propylene copolymer used

| | B7 | B8 | B9 | B10 | B11 | B12 |
|---|---|---|---|---|---|---|
| Mw | 103,000 | 110,000 | 109,000 | 98,000 | 108,000 | 82,000 |
| Mw/Mn | 2.07 | 2.04 | 1.91 | 1.85 | 1.98 | 1.84 |
| $C_2$ (wt %) | 57.3 | 60.7 | 53.4 | 49.2 | 47.2 | 63.6 |
| MFR (2.16 kg) | 8.0 | 7.9 | 4.9 | 12.0 | 12.0 | 9.2 |
| HL-MFR (21.6 kg) | 184 | 159 | 155 | 377 | 288 | 175 |
| $T_m$ (° C.) (1$^{st}$ melt) | −18.6 | −13.4 | −28.5 | −33.8 | 59.3 | −1.3 |
| Hf (J/g) (1$^{st}$ melt) | 19.4 | 24.1 | 8.6 | 2.4 | 1.7 | 26.8 |
| Tc (° C.) (2$^{nd}$ cool) | −18.8 | −13.5 | −39.2 | −51.3 | −54.8 | −2.3 |
| Hc (J/g) (2$^{nd}$ cool) | 21.9 | 25.0 | 11.6 | 11.4 | 11.7 | 30.9 |
| $T_m$ (° C.) (2$^{nd}$ melt) | −19.8 | −14.3 | −29.6 | −36.0 | 78.6 | −3.2 |
| Hf (J/g) (2$^{nd}$ melt) | 20.8 | 24.4 | 8.3 | 2.9 | 4.1 | 41.5 |

Izod Impact of Compositions

The polypropylene resins selected for this study were combined with the ethylene-propylene copolymer and a propylene-based elastomer to form a TPO, the TPO having a melt flow rate in range of 20 to 35 dg/min, and a total ethylene content in the polymer nominally in the range of 6 or 10 or 12 to 16 or 18 or 20 or 24 wt %, while the ethylene in the EP copolymer phase was from 45 to 55 wt %. The propylene-based elastomer used throughout the examples is one having 16 wt % ethylene-derived units, a ΔHf value of 7.9 J/g, a Tg value of −32° C., and an MFR of 3 g/10 min. Also, throughout the examples the polypropylene used is an isotactic PP, either "Example 2-1" or "Example 2-2", which are, respectively, ExxonMobil PP 9999SS (MFR of 60 g/10 min) and ExxonMobil PP3155 (MFR of 35 g/10 min). The melting point temperatures of the polypropylene are 166±1.5° C. with a heat of fusion of 90 to 97 J/g by DSC.

The following examples are TPO's formed with (inventive) or without (comparative) a propylene-based copolymer.

Inventive Example 1

The composition includes PP Example 2-1, 68.5 wt %, 3.5 wt % of the propylene-based elastomer, and ethylene-propylene copolymer 28 wt %. The polymers were mixed in two stages on a twin screw extruder and then injection molded into bars which were tested for notched Izod impact at both room temperature (22° C.) and at −29° C. The results are tabulated in Table 2.

TABLE 2

Notched Izod for Inventive TPO (with the propylene-based elastomer)

| Sample ID | Notched Izod Impact at 22° C. Force (ft-lb/in$^2$) | Fail Mode | Notched Izod Impact at −29° C. Force (ft-lb/in$^2$) | Fail Mode | FLEX MOD (1% sec) MPa. 0.05 in/min D-790ProA | FLEX MOD (2% sec) MPa. 0.05 in/min D-790ProA |
|---|---|---|---|---|---|---|
| 1 | 2.228 ± 0.0092 | C | 1.18 ± 0.04 | C | 744 | 757 |
| 2 | 1.290 ± 0.090 | C | 0.72 ± 0.02 | C | 809 | 812 |
| 3 | 1.832 ± 0.024 | C | 1.02 ± 0.02 | C | 773 | 790 |
| 4 | 2.210 ± 0.071 | C | 1.23 ± 0.06 | C | 849 | 837 |
| 5 | 1.095 ± 0.030 | C | 0.54 ± 0.04 | C | 756 | 787 |
| 6 | 1.460 ± 0.044 | C | 0.86 ± 0.07 | C | 725 | 764 |
| 7 | 2.087 ± 0.114 | C | 1.10 ± 0.05 | C | 736 | 763 |
| 8 | 0.930 ± 0.065 | C | 0.56 ± 0.03 | C | 827 | 875 |
| 9 | 0.939 ± 0.024 | C | 0.57 ± 0.02 | C | 743 | 787 |

TABLE 2-continued

Notched Izod for Inventive TPO (with the propylene-based elastomer)

| Sample ID | Notched Izod Impact at 22° C. Force (ft-lb/in$^2$) | Fail Mode | Notched Izod Impact at −29° C. Force (ft-lb/in$^2$) | Fail Mode | FLEX MOD (1% sec) MPa. 0.05 in/min D-790ProA | FLEX MOD (2% sec) MPa. 0.05 in/min D-790ProA |
|---|---|---|---|---|---|---|
| 10 | 1.340 ± 0.042 | C | 0.85 ± 0.12 | C | 852 | 861 |
| 11 | 4.052 ± 0.341 | C | 1.23 ± 0.11 | C | — | — |

Comparative Example 2

The comparative example, not including the propylene-based elastomer, includes PP 68.5 wt % Example 2-1, and 31.5 wt % ethylene-propylene copolymer. The samples were mixed and tested as in the previous example. The results are tabulated in Table 3.

TABLE 3

Notched Izod for Comparative TPO

| Sample ID | Notched Izod Impact at 22° C. Force (ft-lb/in$^2$) | Fail Mode | Notched Izod Impact at −29° C. Force (ft-lb/in$^2$) | Fail Mode | FLEX MOD (1% sec) MPa. 0.05 in/min D-790ProA | FLEX MOD (2% sec) MPa. 0.05 in/min D-790ProA |
|---|---|---|---|---|---|---|
| 1 | 1.021 ± 0.024 | C | 0.689 ± 0.039 | C | 806.8 | 808.4 |
| 2 | 0.875 ± 0.033 | C | 0.569 ± 0.053 | C | 862.5 | 871.45 |
| 3 | 1.247 ± 0.080 | C | 0.890 ± 0.055 | C | 774.7 | 833.8 |
| 4 | 0.904 ± 0.065 | C | 0.641 ± 0.048 | C | 912.4 | 907.7 |
| 5 | 0.846 ± 0.069 | C | 0.523 ± 0.065 | C | 900.8 | 920.9 |
| 6 | 1.146 ± 0.083 | C | 0.785 ± 0.096 | C | 833.9 | 853.3 |
| 7 | 0.883 ± 0.089 | C | 0.643 ± 0.077 | C | 815.1 | 835.3 |
| 8 | 0.736 ± 0.054 | C | 0.510 ± 0.024 | C | 911.2 | 934.8 |
| 9 | 0.766 ± 0.053 | C | 0.561 ± 0.014 | C | 823.4 | 854.1 |
| 10 | 0.807 ± 0.042 | C | 0.563 ± 0.059 | C | 953.2 | 948.8 |
| 11 | 1.025 ± 0.079 | C | 0.689 ± 0.039 | C | | |

Inventive Example 3

The inventive example includes 65.5 wt % PP Example 2-1, 3.5 wt % propylene-based elastomer, and 31 wt % ethylene-propylene copolymer. The samples were mixed and tested as in the previous examples. The results are tabulated in Table 4.

TABLE 4

Notched Izod for Inventive TPO (with the propylene-based elastomer)

| Sample ID | Notched Izod Impact at 22° C. Force (ft-lb/in$^2$) | Fail Mode | Notched Izod Impact at −29° C. Force (ft-lb/in$^2$) | Fail Mode |
|---|---|---|---|---|
| 1 | 2.456 ± 0.092 | H | 1.060 ± 0.044 | C |
| 2 | 5.327 ± 0.262 | P | 1.490 ± 0.293 | C |
| 3 | 3.026 ± 0.306 | C | 1.359 ± 0.029 | C |
| 4 | / | / | / | / |
| 5 | / | / | / | / |
| 6 | 3.577 ± 0.182 | H | 1.303 ± 0.133 | C |
| 7 | / | / | / | / |
| 8 | / | / | / | / |
| 9 | 1.749 ± 0.099 | C | 0.966 ± 0.086 | C |
| 10 | 9.642 ± 0.178 | NB | 1.607 ± 0.213 | C |
| 11 | 2.456 ± 0.092 | H | 1.060 ± 0.044 | C |

Comparative Example 4

This comparative examples includes 65.5 wt % PP Example 2-1, no propylene-based elastomer, and 34.5 wt % ethylene-propylene copolymer. The samples were mixed and tested as in the previous examples. The results are tabulated in Table 5.

TABLE 5

Notched Izod for Comparative TPO

| Sample ID | Notched Izod Impact at 22° C. Force (ft-lb/in$^2$) | Fail Mode | Notched Izod Impact at −29° C. Force (ft-lb/in$^2$) | Fail Mode |
|---|---|---|---|---|
| 1 | 1.562 ± 0.072 | C | 0.83 ± 0.105 | C |
| 2 | 1.097 ± 0.064 | C | 0.767 ± 0.064 | C |
| 3 | 1.641 ± 0.105 | C | 1.080 ± 0.057 | C |
| 4 | 1.134 ± 0.017 | C | 0.744 ± 0.102 | C |
| 5 | / | / | / | / |
| 6 | / | / | / | / |
| 7 | 0.938 ± 0.103 | C | 0.723 ± 0.075 | C |
| 8 | / | / | / | / |
| 9 | / | / | / | / |
| 10 | 0.941 ± 0.045 | C | 0.656 ± 0.044 | C |
| 11 | 1.800 ± 0.074 | C | 1.030 ± 0.052 | C |

Inventive Example 5

This inventive example TPO includes 68.5 wt % PP Example 2-2, 3.5 wt % propylene-based elastomer, and 28 wt % ethylene-propylene copolymer. The samples were mixed and tested as in the previous examples. The results are tabulated in Table 6.

TABLE 6

Notched Izod for Inventive TPO (with the propylene-based elastomer)

| Sample ID | Notched Izod Impact at 22° C. Force (ft-lb/in$^2$) | Fail Mode | Notched Izod Impact at −29° C. Force (ft-lb/in$^2$) | Fail Mode | FLEX MOD (1% sec) MPa. 0.05 in/min D-790ProA | FLEX MOD (2% sec) MPa. 0.05 in/min D-790ProA |
|---|---|---|---|---|---|---|
| 1 | 5.878 ± 0.125 | P | 1.46 ± 0.22 | C | 673.6 | 686.4 |
| 2 | 2.122 ± 0.089 | P | 0.67 ± 0.09 | C | 772.8 | 767.23 |
| 3 | 6.542 ± 0.265 | NB | 1.54 ± 0.10 | C | 673.6 | 684.4 |
| 4 | 9.293 ± 0.104 | NB | 1.45 ± 0.05 | C | 666.5 | 708.8 |
| 5 | 1.968 ± 0.050 | P | 0.66 ± 0.05 | C | 712.7 | 731.6 |
| 6 | 3.947 ± 0.103 | P | 0.980 ± .08 | C | 676.7 | 701.1 |
| 7 | 6.65 ± 0.321 | NB | 1.19 ± 0.06 | C | 668.9 | 704.3 |
| 8 | 1.389 ± 0.118 | C | 0.66 ± 0.07 | C | 782.2 | 772.6 |
| 9 | 1.263 ± 0.082 | C | 0.60 ± 0.08 | C | 661.7 | 695 |
| 10 | 2.171 ± 0.050 | C | 0.98 ± 0.11 | C | 758.1 | 763.3 |
| 11 | 34.61 ± 0.329 | NB | 1.53 ± 0.15 | C | | |

Comparative Example 6

This example includes 68.5 wt % PP Example 2-2, no propylene-based elastomer, and 31.5 wt % ethylene-propylene copolymer. The samples were mixed and tested as in the previous examples. The results are tabulated in Table 7.

TABLE 7

Notched Izod for Inventive TPO (with the propylene-based elastomer)

| Sample ID | Notched Izod Impact at 22° C. Force (ft-lb/in$^2$) | Fail Mode | Notched Izod Impact at −29° C. Force (ft-lb/in$^2$) | Fail Mode | FLEX MOD (1% sec) MPa. 0.05 in/min D-790ProA | FLEX MOD (2% sec) MPa. 0.05 in/min D-790ProA |
|---|---|---|---|---|---|---|
| 1 | 2.128 ± 0.203 | C | 0.984 ± 0.059 | C | 655.2 | 681.4 |
| 2 | 1.172 ± 0.029 | H | 0.785 ± 0.062 | C | 761.2 | 776.6 |
| 3 | 2.137 ± 0.144 | C | 1.070 ± 0.048 | C | 706.3 | 724 |
| 4 | 1.672 ± 0.105 | C | 1.020 ± 0.078 | C | 780.5 | 787.1 |
| 5 | 1.103 ± 0.059 | H | 1.020 ± 0.078 | C | 741.3 | 761.6 |
| 6 | 1.964 ± 0.085 | H | 0.915 ± 0.045 | C | 699.5 | 737.1 |
| 7 | 1.502 ± 0.053 | C | 0.813 ± 0.059 | C | 735 | 766.7 |
| 8 | 1.045 ± 0.045 | C | 0.585 ± 0.039 | C | 759.1 | 800.4 |
| 9 | 0.935 ± 0.068 | C | 0.592 ± 0.065 | C | 721.8 | 764.8 |
| 10 | 1.466 ± 0.048 | C | 0.779 ± 0.060 | C | 803.5 | 818.02 |
| 11 | 1.905 ± 0.009 | C | 1.1 ± 0.139 | C | — | — |

Inventive Example 7

This example includes 65 wt % PP Example 2-2, 3.5 wt % propylene-based elastomer, and 31.5 wt % ethylene-propylene copolymer. The samples were mixed and tested as in the previous examples. The results are tabulated in Table 8.

TABLE 8

Notched Izod for Inventive TPO (includes ethylene-propylene elastomer)

| Sample ID | Notched Izod Impact at 22° C. Force (ft-lb/in$^2$) | Fail Mode | Notched Izod Impact at −29° C. Force (ft-lb/in$^2$) | Fail Mode |
|---|---|---|---|---|
| 1 | 8.807 ± 0.068 | NB | 7.5 ± 0.35 | P |
| 2 | 3.962 ± 0.121 | P | 1.219 ± 0.029 | C |
| 3 | 9.120 ± 0.146 | NB | 7.52 ± 0.105 | P |
| 4 | 10.360 ± 0.093 | NB | 8.874 ± 0.253 | NB |
| 5 | / | / | / | / |
| 6 | / | / | / | / |
| 7 | 8.855 ± 0.437 | NB | 1.5 ± 0.189 | C |
| 8 | / | / | / | / |
| 9 | / | / | / | / |
| 10 | 5.663 ± 0.049 | P | 1.180 ± 0.114 | C |
| 11 | 38.67 ± 1.161 | NB | 8.681 ± 0.054 | NB |

Comparative Example 8

These examples include 65 wt % PP Example 2-2, no propylene-based elastomer, and 35 wt % ethylene-propylene copolymer. The samples were mixed and tested as in the previous examples. The results are tabulated in Table 9.

TABLE 9

Notched Izod for Comparative TPO

| Sample ID | Notched Izod Impact at 22° C. Force (ft-lb/in$^2$) | Fail Mode | Notched Izod Impact at −29° C. Force (ft-lb/in$^2$) | Fail Mode |
|---|---|---|---|---|
| 1 | 6.859 ± .049 | P | 1.44 ± 0.065 | C |
| 2 | 1.856 ± 0.210 | H | 0.968 ± 0.029 | C |
| 3 | 6.842 ± 0.074 | P | 1.59 ± 0.059 | C |
| 4 | 8.549 ± 0.881 | NB | 1.260 ± .163 | C |
| 5 | / | / | / | / |
| 6 | / | / | / | / |
| 7 | 1.800 ± 0.074 | C | 1.030 ± 0.052 | C |
| 8 | / | / | / | / |
| 9 | / | / | / | / |
| 10 | 1.673 ± 0.077 | C | 0.865 ± 0.075 | C |
| 11 | 2.919 ± 0.158 | H | 1.380 ± 0.079 | C |

Now, having described the various aspects of the inventive TPO compositions and automotive components made therefrom, described here in numbered paragraphs is:

P1. A thermoplastic polyolefin composition comprising (or consisting essentially of):
- a polypropylene having a melting point temperature ($T_m$) of greater than 130° C. and a melt flow rate (230° C./2.16 kg) within the range from 10, or 18 g/10 min to 40, or 50, or 60, or 80 g/10 min;
- an ethylene-propylene copolymer comprising within the range from 40, or 45 wt % to 55, or 60, or 65, or 80 wt % ethylene derived units and having a melt flow rate (230° C./2.16 kg) within the range from 0.1, or 1, or 5 g/10 min to 8, or 10, or 12, or 20 g/10 min, a Mw/Mn within the range from 1.8, or 2.0 to 2.8, or 3.0, or 4.0, and a weight average molecular weight (Mw) within a range of from 50,000, or 60,000 g/mole to 120,000, or 200,000, or 300,000 g/mole; and
- a propylene-based elastomer having within the range from 5 to 25 wt % ethylene derived units and having a melting point temperature ($T_m$) of less than 110° C. and a Mw/Mn within the range from 2.0 to 4.0.

P2. A thermoplastic polyolefin composition comprising (or consisting essentially of) a cooled melt blend of:
- from 55 to 75 wt %, by weight of the composition, of a polypropylene having a melting point temperature ($T_m$) of greater than 130° C. and a melt flow rate (230° C./2.16 kg) within the range from 20 g/10 min to 50 g/10 min;
- from 0.1 to 5 wt %, by weight of the composition, of a propylene-based elastomer having within the range from 12 to 20 wt % ethylene derived units and having a melting point temperature ($T_m$) of less than 110° C.; and
- an ethylene-propylene copolymer comprising within the range from 45 wt % to 60 wt % ethylene derived units and having a melt flow rate (230° C./2.16 kg) within the range from 1 g/10 min to 10 g/10 min, and a weight average molecular weight (Mw) within a range of from 60,000 g/mole to 120,000 g/mole.

P3. The thermoplastic polyolefin composition of numbered paragraph 1, wherein the polypropylene is present within a range of from 50 wt % to 90 wt %; and the ethylene-propylene copolymer is present within a range from 10 wt % to 40 wt %; and wherein the propylene-based elastomer is present to within a range from 1.0 wt % to 10 wt %, each based on the weight of all ingredients of the composition.

P4. The thermoplastic polyolefin composition of any one of the previous numbered paragraphs, wherein the ethylene-propylene copolymer has a melting point temperature ($T_m$) of less than 80 or 100° C. (first melt); preferably within a range of from −50, or −40, or −30, or −20° C. to 20, or 40, or 50, or 60° C.

P5. The thermoplastic polyolefin composition of any one of the previous numbered paragraphs, wherein the ethylene-propylene copolymer has a heat of fusion ($H_f$) of less than 40, or 50 J/g (first melt); preferably within a range of from 0 or 10, or 20 J/g to 40, or 50, or 60, or 70 J/g.

P6. The thermoplastic polyolefin composition of any one of the previous numbered paragraphs, wherein the ethylene-propylene copolymer has a glass transition temperature ($T_g$) within a range of from −80, or −60, or −50° C. to −30, or −20, or −10° C.

P7. The thermoplastic polyolefin composition of any one of the previous numbered paragraphs, wherein the ethylene-propylene copolymer has a high-load MFR within the range of from 100, or 120, or 140, or 160 g/10 min to 220, or 240, or 260, or 280 g/10 min.

P8. The thermoplastic polyolefin composition of any one of the previous numbered paragraphs, wherein the weight average molecular weight (Mw) of the propylene-based elastomer is at least 150,000 g/mole; or within a range from 150,000, or 200,000 g/mole to 300,000, or 400,000, or 500,000 g/mole.

P9. The thermoplastic polyolefin composition of any one of the previous numbered paragraphs, wherein the same composition without the propylene-based elastomer cracked (lost ductility) at less than 0.90 ft-lb/in$^2$ (1.9 kJ/m$^2$) at −29° C.

P10. The thermoplastic polyolefin composition of any one of the previous numbered paragraphs, wherein the composition only partially breaks or there is no break at −29° C. (ASTM D256) with Notched Izod Force of between 1.0, or 4.0, or 6.0, to 10, or 12 ft-lb/in$^2$ (2.1, or 8.4, or 12.6, or 21, or 25 kJ/m$^2$).

P11. The thermoplastic polyolefin composition of any one of the previous numbered paragraphs, wherein the composition only partially breaks or there is no break at 22° C. (ASTM D256) with Notched Izod Force of between 10, or 15, or 20 to 30, or 40 ft-lb/in$^2$ (21, or 32, or 42, or 63, or 84 kJ/m$^2$).

P12. The thermoplastic polyolefin composition of any one of the previous numbered paragraphs, wherein the composition has a 1% Secant Flexural Modulus (0.05 in/min, D790 ProA) within a range of from 600 or 700 or 750 MPa to 850 or 900 or 950 or 1000 or 1100 MPa, or greater than 600 or 700 or 800 or 850 MPa.

P12. The thermoplastic polyolefin composition of any one of the previous numbered paragraphs, wherein the composition has a total ethylene content in the polymer nominally in the range of 6, or 10, or 12 to 16, or 18, or 20, or 24 wt %.

P13. An automotive component made from the thermoplastic polyolefin composition of any one of the previous numbered paragraphs. Also described is the use of the inventive TPO in an automotive component, the TPO as described in any of the previous numbered paragraphs.

P14. A method of injection molding an automotive component comprising melt extrusion and injection into a mold the thermoplastic polyolefin composition of numbered paragraph 13.

For all jurisdictions in which the doctrine of "incorporation by reference" applies, all of the test methods, patent publications, patents and reference articles are hereby incorporated by reference either in their entirety or for the relevant portion for which they are referenced.

What is claimed is:

1. A thermoplastic polyolefin composition comprising:
   - a polypropylene having a melting point temperature ($T_m$) of greater than 130° C. and a melt flow rate (230° C./2.16 kg) within the range from 10 g/10 min to 60 g/10 min;
   - an ethylene-propylene copolymer comprising within the range from 40 wt % to 55 wt % ethylene derived units and having a melt flow rate (230° C./2.16 kg) within the range from 0.1 g/10 min to 20 g/10 min, a Mw/Mn within the range from 1.8 to 4.0, a high-load melt flow rate (ASTM D 1238, Condition L (230° C.), 21.6 kg) within the range of from 100 g/10 min to 280 g/10 min, and a weight average molecular weight (Mw) within a range of from 50,000 g/mole to 300,000 g/mole; and
   - from 0.1 wt % to 5 wt %, based on the weight of all ingredients of the composition, of a propylene-based elastomer having within the range from 9 to 18 wt % ethylene derived units and having a melting point temperature ($T_m$) of less than 110° C., a weight average molecular weight (Mw) of at least 150,000 g/mole, a heat of fusion ($H_f$) of less than 40 J/g (first melt), and a Mw/Mn within the range from 2.0 to 4.0;
wherein the composition only partially breaks or there is no break at 22° C. (ASTM D 256) with Notched Izod Force of between 10 to 40 ft-lb/in².

2. The thermoplastic polyolefin composition of claim 1, wherein the propylene-based elastomer has a propylene content of at least 83 wt % up to 88 wt %.

3. The thermoplastic polyolefin composition of claim 1, wherein the ethylene-propylene copolymer has a melting point temperature ($T_m$) of less than 100° C. (first melt).

4. The thermoplastic polyolefin composition of claim 1, wherein the ethylene-propylene copolymer has a heat of fusion ($H_f$) of less than 50 J/g (first melt).

5. The thermoplastic polyolefin composition of claim 1, wherein the ethylene-propylene copolymer has a glass transition temperature ($T_g$) within a range of from −80° C. to −10° C.

6. The thermoplastic polyolefin composition of claim 1, wherein the ethylene-propylene copolymer has a high-load melt flow rate (ASTM D 1238, Condition L (230° C.), 21.6 kg) within the range of from 120 g/10 min 260 g/10 min.

7. The thermoplastic polyolefin composition of claim 1, the propylene-based elastomer consists essentially of propylene and ethylene.

8. The thermoplastic polyolefin composition of claim 1, wherein the same composition without the propylene-based elastomer cracked (lost ductility, ASTM D 256 at less than 0.90 ft-lb/in² (1.9 kJ/m²) at −29° C.

9. The thermoplastic polyolefin composition of claim 1, wherein the composition only partially breaks or there is no break at −29° C. (ASTM D 256) with Notched Izod Force of between 1.0 to 12 ft-lb/in².

10. The thermoplastic polyolefin composition of claim 1, wherein the composition has a total ethylene content within in the range of 6 to 24 wt %.

11. An automotive component made from the thermoplastic polyolefin composition of claim 1.

12. The thermoplastic polyolefin composition of claim 1, wherein the composition has a 1% Secant Flexural Modulus (0.05 in/min, ASTM D 790 ProA) of greater than 600 MPa.

13. The thermoplastic polyolefin composition of claim 1, wherein from 55 to 75 wt %, by weight of the composition, is the polypropylene, from 0.1 to 5 wt %, by weight of the composition, is the propylene-based elastomer, and the remainder of the composition is the ethylene-propylene elastomer and any additives.

14. The thermoplastic polyolefin composition of claim 1, wherein the polypropylene is present within a range of from 50 wt % to 90 wt % and the propylene-based elastomer is present to within a range from 0.1 wt % to 5 wt %, each based on the weight of all ingredients of the composition; and the remainder of the composition is the ethylene-propylene elastomer and any additives.

15. The thermoplastic polyolefin composition of claim 1, wherein the polypropylene is present within a range of from 50 wt % to 90 wt %, based on the weight of all ingredients of the composition.

16. The thermoplastic polyolefin composition of claim 1, wherein the ethylene-propylene copolymer is present within a range from 10 wt % to 40 wt %, based on the weight of all ingredients of the composition.

17. The thermoplastic polyolefin composition of claim 1, wherein the propylene-based elastomer is present to within a range from 1.0 wt % to 5 wt %, based on the weight of all ingredients of the composition.

18. The thermoplastic polyolefin composition of claim 1, wherein the propylene-based elastomer has a melting point temperature ($T_m$) of less than 90° C. (first melt).

19. The thermoplastic polyolefin composition of claim 1, wherein the propylene-based elastomer has a heat of fusion ($H_f$) of 0.5 to less than 25 J/g (first melt).

20. The thermoplastic polyolefin composition of claim 1, wherein the composition has a 1% Secant Flexural Modulus (0.05 in/min, ASTM D 790 ProA) of from 600 to 1100 MPa.

21. The thermoplastic polyolefin composition of claim 1, wherein the propylene-based elastomer has a heat of fusion ($H_f$) of less than 25 J/g (first melt).

22. The thermoplastic polyolefin composition of claim 1, the composition only partially breaks or there is no break at 22° C. (ASTM D 256) with Notched Izod Force of between 15 to 40 ft-lb/in².

23. The thermoplastic polyolefin composition of claim 1, wherein the composition only partially breaks or there is no break at −29° C. (ASTM D 256) with Notched Izod Force of between 4.0 to 12 ft-lb/in².

24. The thermoplastic polyolefin composition of claim 1, wherein the composition only partially breaks or there is no break at 22° C. (ASTM D 256) with Notched Izod Force of between 20 to 40 ft-lb/in².

25. The thermoplastic polyolefin composition of claim 1, wherein the composition only partially breaks or there is no break at 22° C. (ASTM D 256) with Notched Izod Force of between 30 to 40 ft-lb/in².

* * * * *